United States Patent
Lonkar et al.

(10) Patent No.: US 11,620,045 B2
(45) Date of Patent: *Apr. 4, 2023

(54) ALTERNATE CONTENT INSERTION LOGIC

(71) Applicant: Snap Inc., Santa Monica, CA (US)

(72) Inventors: Chinmay Lonkar, Playa Vista, CA (US); Ivan King Yu Sham, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,697

(22) Filed: Sep. 1, 2021

(65) Prior Publication Data

US 2021/0397337 A1    Dec. 23, 2021

Related U.S. Application Data

(63) Continuation of application No. 16/665,856, filed on Oct. 28, 2019, now Pat. No. 11,137,901, which is a continuation of application No. 15/587,890, filed on May 5, 2017, now Pat. No. 10,496,272.

(51) Int. Cl.
| | |
|---|---|
| *G06F 3/048* | (2013.01) |
| *G06F 3/04883* | (2022.01) |
| *G06N 5/04* | (2023.01) |
| *G06F 3/0482* | (2013.01) |

(52) U.S. Cl.
CPC ........ *G06F 3/04883* (2013.01); *G06F 3/0482* (2013.01); *G06N 5/04* (2013.01)

(58) Field of Classification Search
None
See application file for complete search history.

(56) References Cited

U.S. PATENT DOCUMENTS

| | | |
|---|---|---|
| 10,496,272 B1 | 12/2019 | Lonkar et al. |
| 11,137,901 B1 | 10/2021 | Lonkar et al. |

(Continued)

OTHER PUBLICATIONS

U.S. Appl. No. 15/587,890 U.S. Pat. No. 10,496,272, filed May 5, 2017, Alternate Content Insertion Logic.

(Continued)

*Primary Examiner* — William C Trapanese
(74) *Attorney, Agent, or Firm* — Schwegman Lundberg & Woessner, P.A.

(57) ABSTRACT

A collection management system presents, as part of a content discovery session, a first content item from a content discovery collection that includes a plurality of content items that are ordered sequentially for presentation. In response to receiving an advancement input, the collection management system determines whether a number of content items presented as part of the content discovery session meets or exceeds a threshold number of content items, and whether an amount of elapsed time of the content discovery session meets or exceeds a threshold amount of time. The collection management system presents a first alternate content item as part of the content discover session. The first alternate content item is not included in the content discovery collection. After presenting the first alternate content item, the collection management system presents a second content item from the content discover collection that is ordered after the first content item.

20 Claims, 12 Drawing Sheets

(56) References Cited

U.S. PATENT DOCUMENTS

| | | | |
|---|---|---|---|
| 2014/0122226 A1* | 5/2014 | Downing | G06Q 30/0272 705/14.49 |
| 2015/0066959 A1* | 3/2015 | Yi | G06F 16/9535 707/751 |
| 2015/0242901 A1* | 8/2015 | Losey | G11B 27/102 705/14.61 |
| 2016/0162953 A1 | 6/2016 | Tang | |
| 2016/0219119 A1 | 7/2016 | Yu et al. | |

OTHER PUBLICATIONS

U.S. Appl. No. 16/665,856, filed Oct. 28, 2019, Alternate Content Insertion Logic.

"U.S. Appl. No. 15/587,890, Examiner Interview Summary dated Nov. 29, 2018", 3 pgs.

"U.S. Appl. No. 15/587,890, Final Office Action dated May 2, 2019", 9 pgs.

"U.S. Appl. No. 15/587,890, Non Final Office Action dated Oct. 5, 2018", 8 pgs.

"U.S. Appl. No. 15/587,890, Notice of Allowance dated Jul. 29, 2019".

"U.S. Appl. No. 15/587,890, Response filed Jan. 4, 2019 to Non Final Office Action dated Oct. 5, 2018", 12 pgs.

"U.S. Appl. No. 15/587,890, Response filed Jun. 14, 2019 to Final Office Action dated May 2, 2019", 10 pgs.

"U.S. Appl. No. 16/665,856, Final Office Action dated Feb. 19, 2021", 5 pgs.

"U.S. Appl. No. 16/665,856, Non Final Office Action dated Aug. 19, 2020", 10 pgs.

"U.S. Appl. No. 16/665,856, Notice of Allowance dated Jun. 3, 2021", 7 pgs.

"U.S. Appl. No. 16/665,856, Response filed Apr. 15, 2021 to Final Office Action dated Feb. 19, 2021", 8 pgs.

"U.S. Appl. No. 16/665,856, Response filed Nov. 10, 2020 to Non Final Office Action dated Aug. 19, 2020", 10 pgs.

* cited by examiner

ALTERNATE CONTENT INSERTION LOGIC

CLAIM OF PRIORITY

This application is a continuation of and claims the benefit of priority of U.S. patent application Ser. No. 16/665,856, filed on Oct. 28, 2019, which is a continuation of and claims the benefit of priority of U.S. patent application Ser. No. 15/587,890, filed on May 5, 2017, each of which are hereby incorporated by reference herein in their entireties.

BACKGROUND

Modern computing systems allow users to capture and view different types of content, such as images, videos, text, applications, etc. Content providers allow users to view collections of content items. Current systems integrate alternate content items into the collections without taking into account the type of content included in the collection and/or a user's usage of the content. This results in inconsistent and/or undesired outputs. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
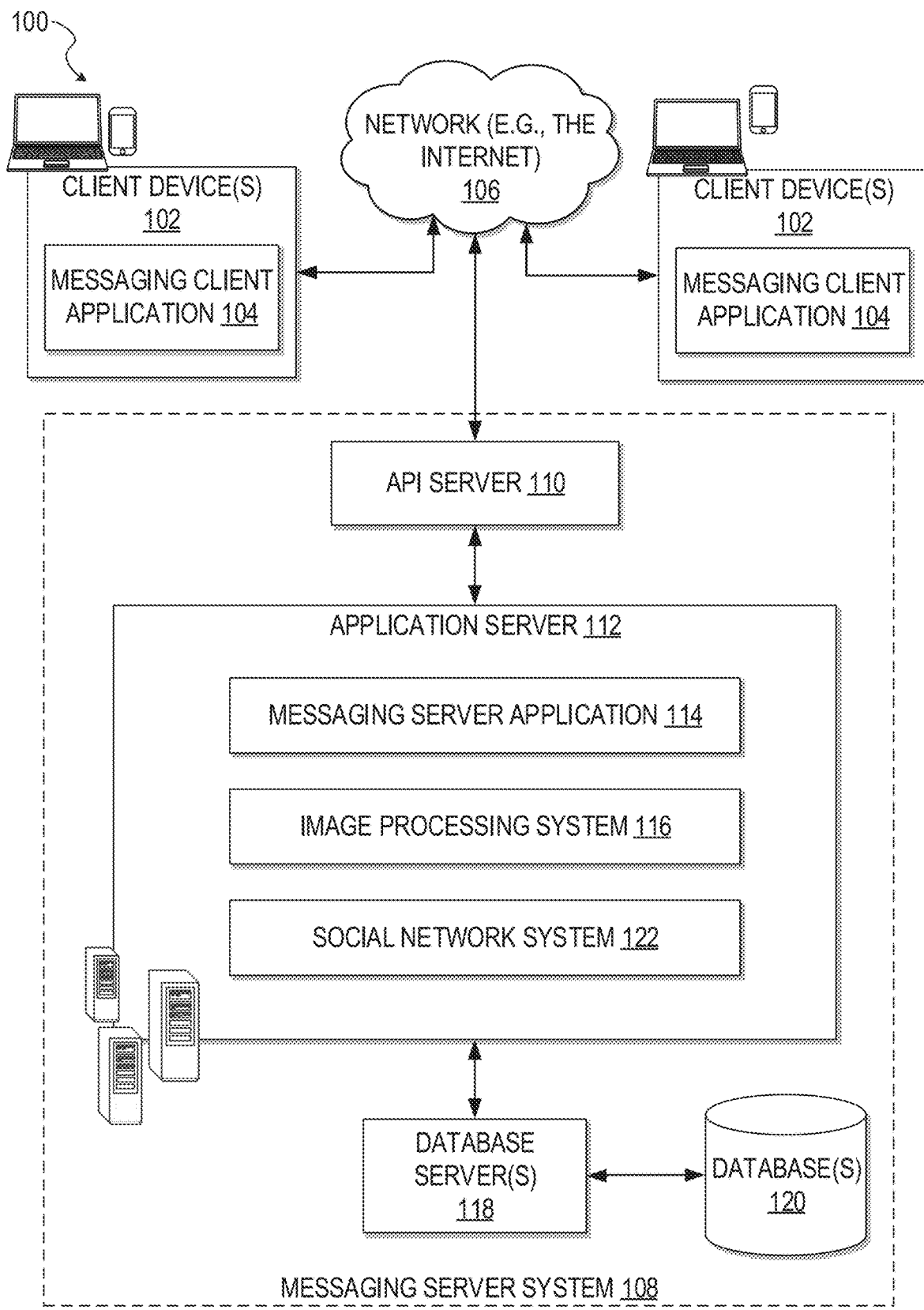
FIG. 1 is a block diagram showing an example messaging system for exchanging data (e.g., messages and associated content) over a network.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments described herein relate to systems and methods for improved alternate content insertion logic. A content discovery collection is a collection of content items provided by an entity that is accessible to other users. For example, an entity such as a news organization, magazine, etc., may generate content and include the content into a content discovery collection, which users may then access (e.g., read, view, etc.). To allow users to discover new content provided by the entity, a content discovery collection can be designated as publicly accessible to users. Accordingly, a user would not have to create a relationship with the entity (e.g., friend, follower, etc.) to access the content included in the content discover collection.

A content discovery collection can include multiple types of content, such as video, text, images, etc. The content items included in a content discovery collection are ordered for presentation. For example, the content items are ordered sequentially such that the content items are presented according to the sequential order as a user selects to view the next or previous content item in the content discovery collection.

A collection management system manages content discovery collections. For example, the collection management system enables an entity to create and modify a content discovery collection, including adding content items, removing content items, selecting the order in which the content items are presented, etc. The collection management system further enables users to initiate a content discovery session to access a content discover collection. For example, the collection management system presents a listing of available content discovery collections, enables a user to select a content discovery collection, initiates a content discovery session of the selected content discovery collection, presents content items included in the selected content discovery collection, enables a user to access the next and/or previous content item ordered in the content discovery collection, etc.

In addition to presenting content items included in a content discovery collection, the collection management system also presents alternate content items as part of the content discovery session. Alternate content items are content items that are not included in the content discovery collection. For example, alternate content items include content items generated by a secondary entity, such as an advertiser, sponsor, etc. The collection management system utilizes logic to insert alternate content items into a content discovery session in a consistent manner that takes into account multiple factors, such as the type of content included in the content discovery collection, how a user is viewing the content, a current position within the content discovery collection, etc.

In response to receiving an advancement input to present a next and/or previous content item, the collection management system determines whether to insert an alternate content based on one or more insertion conditions that dictate when an alternate content item should be inserted into a content discovery session. For example, the collection management system determines whether a number of content items presented as part of the content discovery session meets or exceeds a threshold number of content items, and whether an amount of elapsed time of the content discovery session meets or exceeds a threshold amount of time. In response to determining that an insertion condition has been met, the collection management system presents an alternate content item as part of the content discover session. After presenting the alternate content item, the collection management system presents the requested content item from the content item collection (i.e., the next or previous content item from the content discovery collection).

Drawings

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., Story, content discovery collection), the retrieval of a list of connections (e.g., friends, follower, etc.) of a user of a client device 102, the retrieval of such collections, the retrieval of messages and content, the adding and deletion of connections to the entity graph, the location of connections within the entity graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., stories, content discovery collections, galleries, etc.). These content collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph 304 within the database 120. Examples of functions and services supported by the social network system 122 include the identification of connections between users registered with the messaging system 100. A user or entity registers with the messaging system 100 by creating an account with the messaging system 100. Once a user or entity has registered with the messaging system 100, the user or entity is added to the entity graph and may begin establishing connections with other user and/or entities that are registered with the messaging system 100.

A connection between users indicates a relationship between the users. An example relationship is one user "following" the other user to view content and/or messages posted by the user. Another example relationship is two users become "friends," thereby allowing the users to view content and/or messages posted by the other user. Another example function and service supported by the social network system 122 is the identification of other entities and interests of a particular user.

The application server 112 is communicatively coupled to a database server 118, which facilitates access to a database 120 in which is stored data associated with messages processed by the messaging server application 114.

Figure 2:
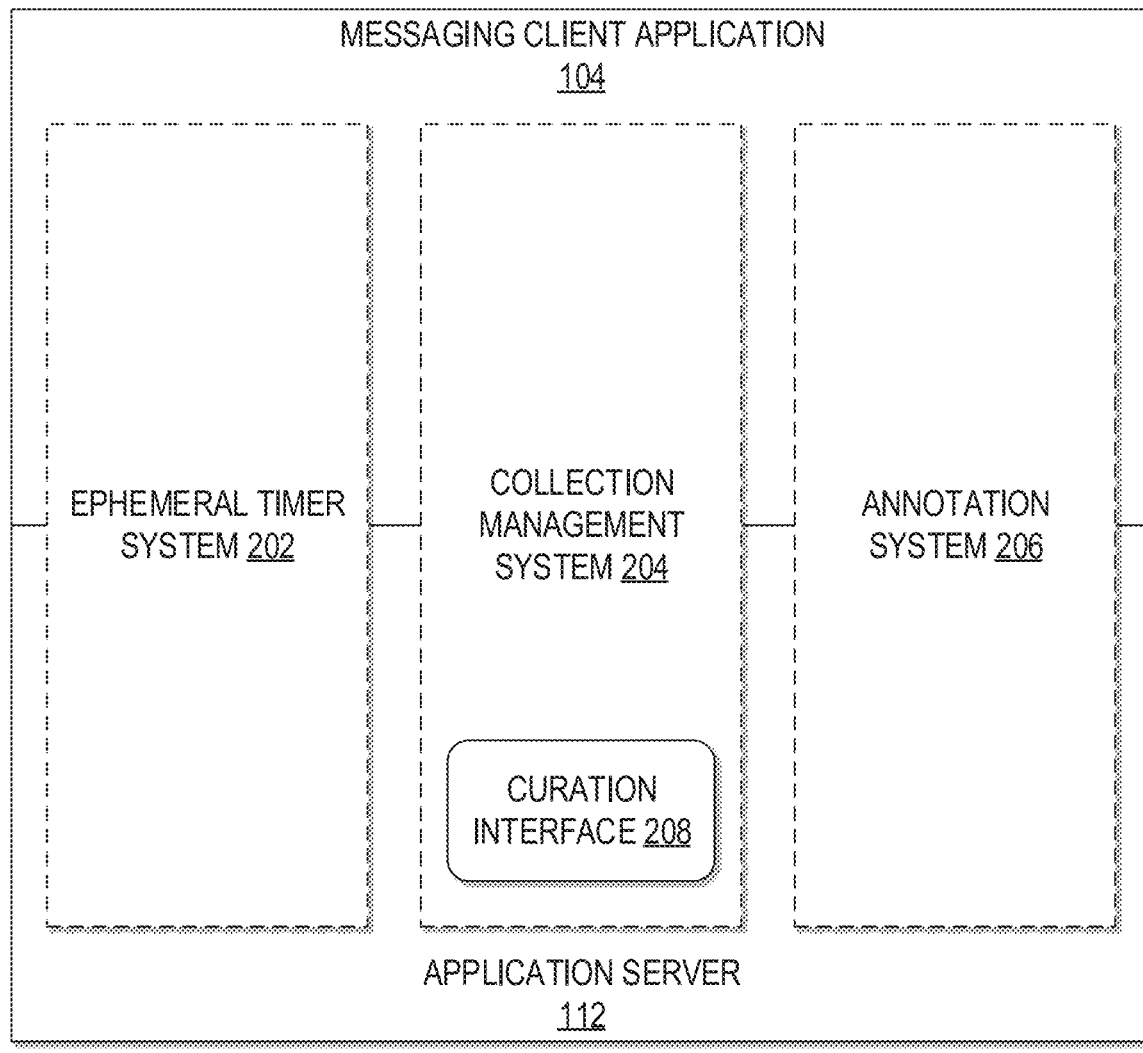
FIG. 2 is a block diagram illustrating further details regarding a messaging system, according to example embodiments.

FIG. 2 is block diagram illustrating further details regarding the messaging system 100. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT Story, content discovery collection, etc.), selectively display and enable access to messages and associated content via the messaging client application 104. Further details regarding the operation of the ephemeral timer system 202 are provided below.

The collection management system 204 is responsible for managing collections of media (e.g., collections of text, image video, and audio data). In some examples, a collection of content (e.g., messages, including images, video, text, and audio) may be organized into an "event gallery," "event story," or "event group story." Such a collection may be made available for a specified time period (i.e., event window), such as the duration of a specified event to which the content relates. For example, content relating to a specified event such as a music concert may be made available as a "Story" for the duration of that music concert. The collection management system 204 may also be responsible for publishing a user interface element (e.g., icon, button, etc.) that provides notification of the existence of a particular collection to the user interface of the messaging client application 104.

A collection may also constitute a "Group Story," which is a collection of content from multiple authorized users that is created manually, automatically or using a combination of manual and automatic techniques. For example, a "Group Story" may constitute a curated stream of user-submitted content from varies locations and events. Users, whose client devices have location services enabled and are at a common location event at a particular time may, for example, be presented with an option, via a user interface of the messaging client application 104, to contribute content to a particular group story. The group story may be identified to the user by the messaging client application 104, based on his or her location as well as the user meeting other specified group eligibility criteria. The end result is a "Group Story" told from a community perspective.

Group stories associated with an event and/or a specific geographic location (e.g., at a wedding,) may include a condition that an authorized user be within a specified distance of the event (e.g., geographic location of the event) to contribute to and/or view content included in the group story. In some embodiments, a user's ability to contribute and/or view a group story may be dependent on that user being connected to a user that initiated the group story. For instance, a user may be required to be within a threshold degree of connection (e.g., friend of a friend).

A collection may also constitute a "content discovery collection." A content discovery collection is a collection of content item provided by an entity that is accessible to other users. For example, an entity such as a news organization, magazine, etc., may generate content and include the content into a content discovery collection, which users may then access (e.g., read, view, etc.). To allow users to discover new content provided by the entity, a content discovery collection can be designated as publicly accessible to users. Accordingly, a user would not have to create a relationship with the entity (e.g., friend, follower, etc.) to access the content included in the content discover collection.

A content discovery collection can include multiple types of content, such as video, text, images, etc. The content items included in a content discovery collection are ordered for presentation. For example, the content items are ordered sequentially such that the content items are presented according to the sequential order as a user selects to view the next or previous content item in the content discovery collection.

The collection management system 204 manages content discovery collections. For example, the collection management system 204 enables an entity to create and modify a content discovery collection, including adding content items, removing content items, selecting the order in which the content items are presented, etc. The collection management system 204 further enables users to initiate a content discovery session to access a content discover collection. For example, the collection management system 204 presents a listing of available content discovery collections, enables a user to select a content discovery collection, initiates a content discovery session of the selected content discovery collection, presents content items included in the selected content discovery collection, enables a user to access the next and/or previous content item ordered in the content discovery collection, etc.

In addition to presenting content items included in a content discovery collection, the collection management system 204 also presents alternate content items as part of the content discovery session. Alternate content items are content items that are not included in the content discovery collection. For example, alternate content items include content items generated by a secondary entity, such as an advertiser, sponsor, etc. The collection management system 204 utilizes logic to insert alternate content items into a content discovery session in a consistent manner that takes into account multiple factors, such as the type of content included in the content discovery collection, how a user is viewing the content, a current position within the content discovery collection, etc.

In response to receiving an advancement input to present a next and/or previous content item, the collection management system 204 determines whether to insert an alternate content based on one or more insertion conditions that dictate when an alternate content item should be inserted into a content discovery session. For example, the collection management system 204 determines whether a number of content items presented as part of the content discovery session meets or exceeds a threshold number of content items, and whether an amount of elapsed time of the content discovery session meets or exceeds a threshold amount of time. In response to determining that an insertion condition has been met, the collection management system 204 presents an alternate content item as part of the content discover session. After presenting the alternate content item, the collection management system 204 presents the requested content item from the content item collection (i.e., the next or previous content item from the content discovery collection).

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
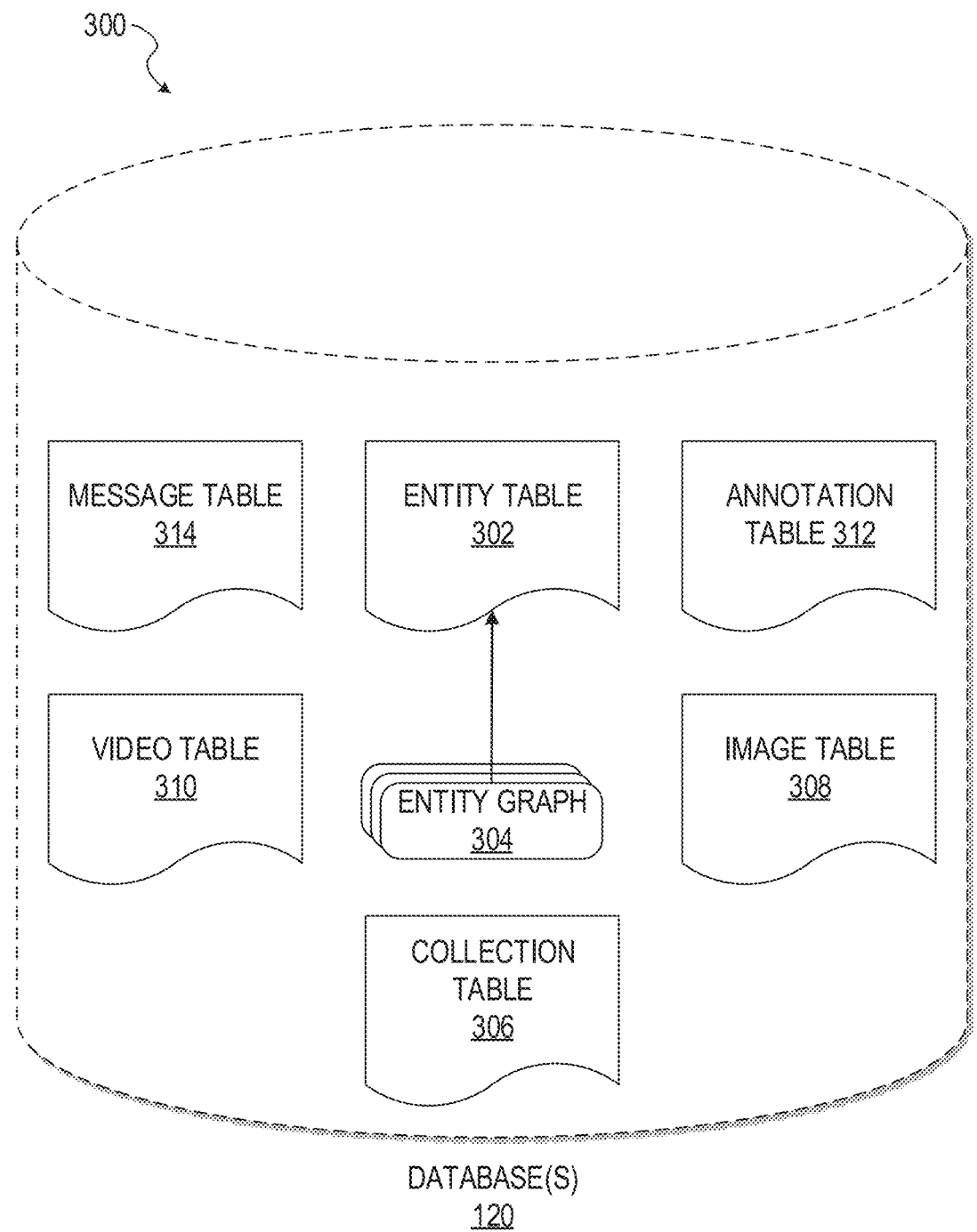
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include registered users, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding connections between the entities. A connection between entities indicates a relationship between the user accounts of entities with relation to the messaging system. An example relationship is one entity "following" the other entity to view content and/or messages posted by the entity. Another example relationship is two entities becoming "friends," thereby allowing the entitites to view content and/or messages posted by the other entity. The entity graph 304 also includes other relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A collection table 306 stores data regarding collections of messages and associated image, video or audio data, which are compiled into a content collection (e.g., a SNAPCHAT Story, content discovery collection, a gallery, etc.). The creation of a particular content collection (e.g., group story, content discovery collection) may be initiated by a particular user or entity (e.g., each user or entity for which a record is maintained in the entity table 302). A created content discovery collection is accessible by authorized users. For example, users that have created a relationship with the entity (e.g., friends, followers, etc.) are authorized to access the content discovery collection. As another example, a content discovery collection may be designated as public to allow all users to access and discover the content provided by the entity. To this end, the user interface of the messaging client application 104 may include an icon that is user selectable to enable a user to access a content discovery collection.

The collection table 306 includes data associated with a created content collection, such as images, messages, video data, audio data, etc. that are included in the content, a title designated to the content collection, a unique identifier for the collection, insertion conditions, etc. Insertions conditions are a set of conditions that result in insertion of an alternate content item into a group story session initiated by a user. For example, the insertion conditions include thresholds (e.g., threshold number of content items, threshold amount of elapsed time) that, when met, result in insertion of an alternate content item.

Figure 4:
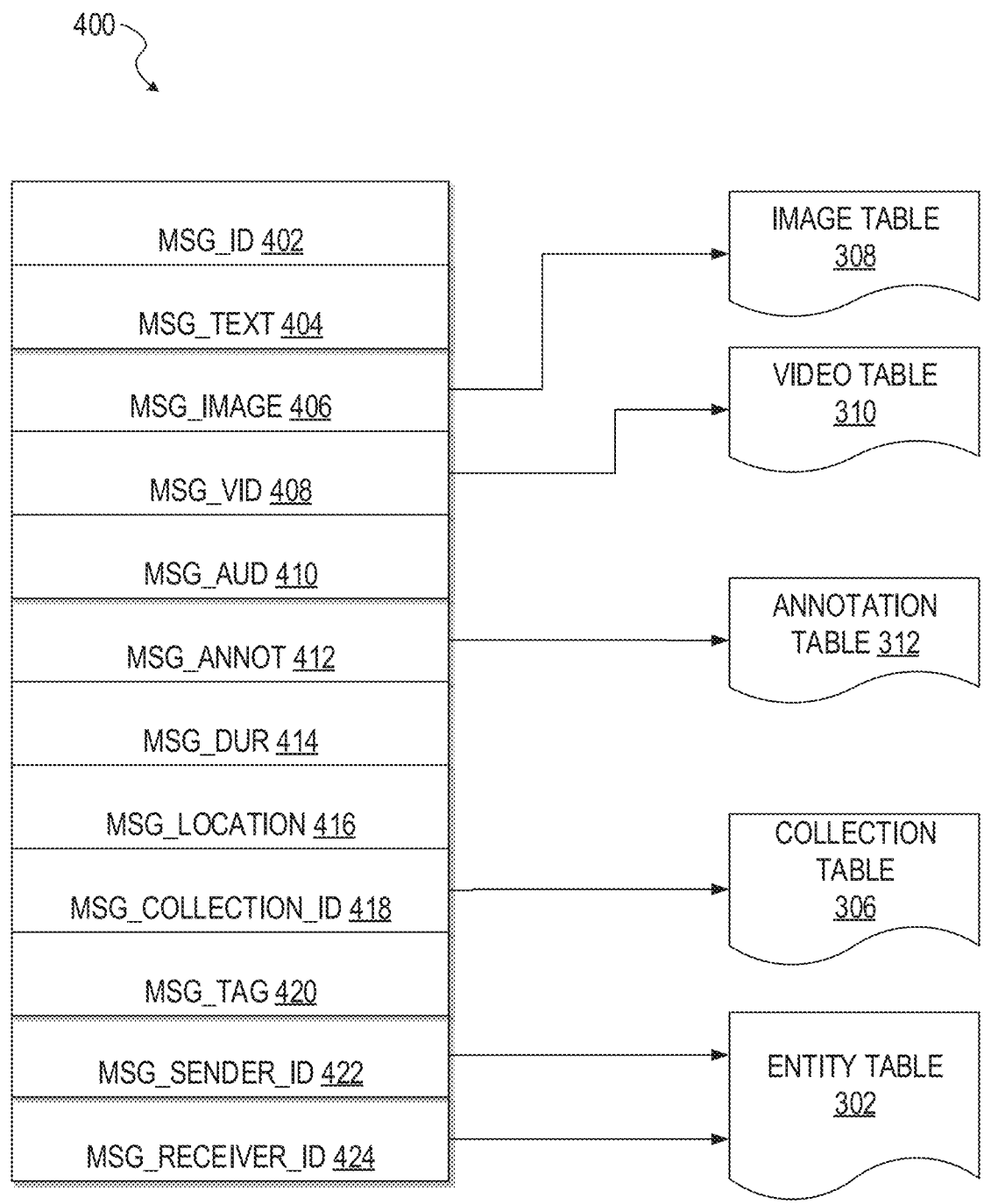
FIG. 4 is a schematic diagram illustrating a structure of a message, according to some embodiments.

FIG. 4 is a schematic diagram illustrating a structure of a message. The message is generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A collection identifier 418: identifier values identifying one or more content collections (e.g., content discovery collection, stories, etc.) with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message collection identifier 418 may point to data stored in a collection table 306, and values stored within the message sender identifier 422 and the message receiver identifier 424 may point to user records stored within an entity table 302.

Figure 5:
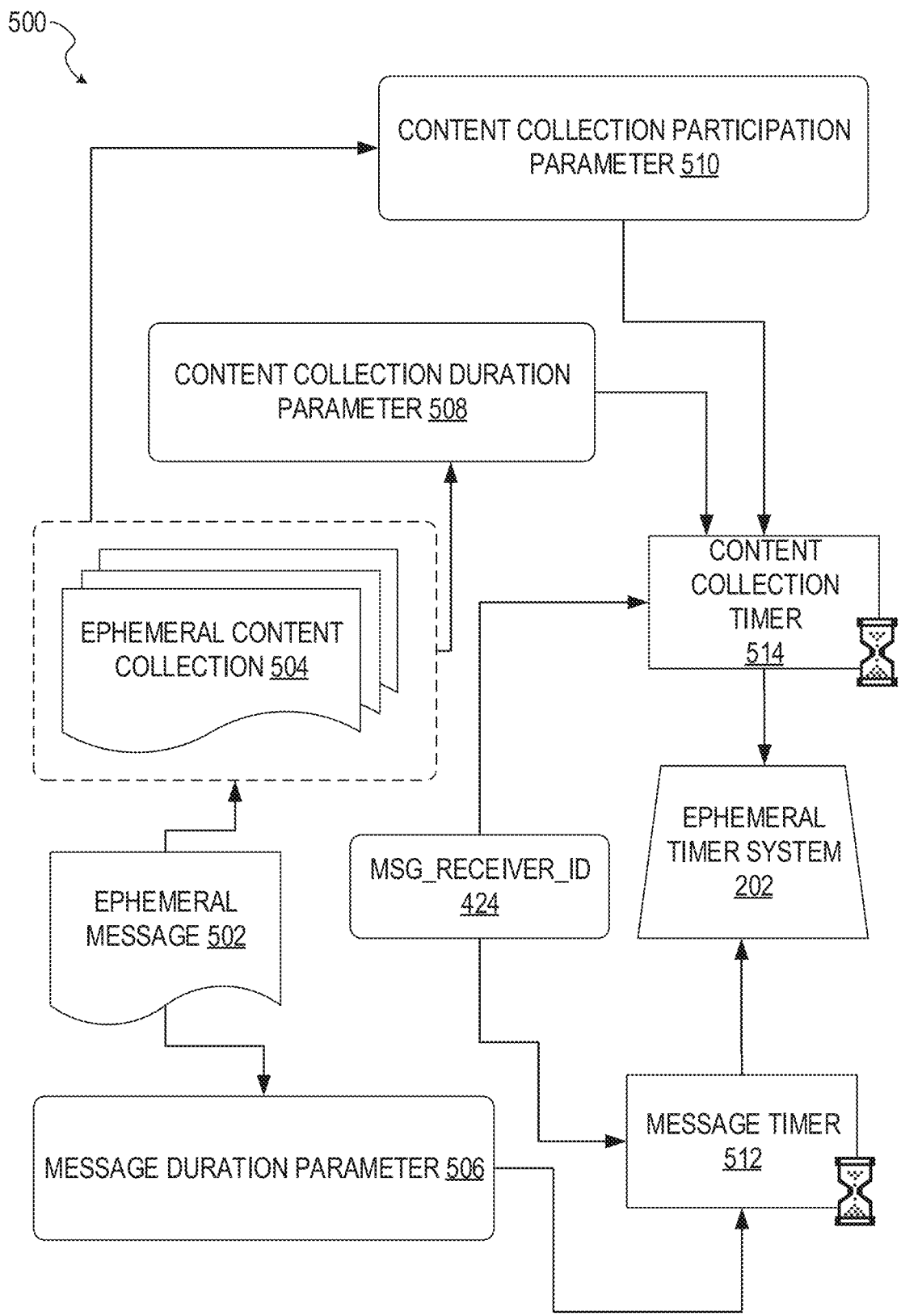
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral content collection 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message content collection 504 (e.g., a personal SNAPCHAT Story, an event story, group story, content discovery collection, etc.). The ephemeral content collection 504 has an associated content collection duration parameter 508, a value of which determines a time-duration for which the ephemeral message content collection 504 is presented and accessible to users of the messaging system 100. The content collection duration parameter 508, for example, may be the duration of a music concert, where the ephemeral message content collection 504 is a collection of content pertaining to that concert. Alternatively, a user (either the owning user or a curator user) may specify the value for the content collection duration parameter 508 when performing the setup and creation of the ephemeral message content collection 504.

Additionally, each ephemeral message 502 within the ephemeral message content collection 504 has an associated content collection participation parameter 510, a value of which determines the duration of time for which the ephemeral message 502 will be accessible within the context of the ephemeral message content collection 504. Accordingly, a particular ephemeral message 502 may "expire" and become inaccessible within the context of the ephemeral content collection 504, prior to the ephemeral content collection 504 itself expiring in terms of the content collection duration parameter 508. The content collection duration parameter 508, content collection participation parameter 510, and message receiver identifier 424 each provide input to a content collection timer 514, which operationally determines, firstly, whether a particular ephemeral message 502 of the ephemeral content collection 504 will be displayed to a particular receiving user and, if so, for how long. Note that the ephemeral content collection 504 utilizes the message receiver identifier 424 to identify the particular receiving user.

Accordingly, the content collection timer 514 operationally controls the overall lifespan of an associated ephemeral content collection 504, as well as an individual ephemeral message 502 included in the ephemeral content collection 504. In one embodiment, each and every ephemeral message 502 within the ephemeral content collection 504 remains viewable and accessible for a time-period specified by the content collection duration parameter 508. In a further embodiment, a certain ephemeral message 502 may expire, within the context of the ephemeral content collection 504, based on a content collection participation parameter 510. Note that a message duration parameter 506 indicates the duration of time for which a particular ephemeral message 502 is displayed to a receiving user, even within the context of the ephemeral content collection 504. Accordingly, the message duration parameter 506 indicates the duration of time that a particular ephemeral message 502 is displayed to a receiving user, regardless of whether the receiving user is viewing that ephemeral message 502 inside or outside the context of an ephemeral content collection 504.

The ephemeral timer system 202 may furthermore operationally remove a particular ephemeral message 502 from the ephemeral content collection 504 based on a determination that it has exceeded an associated content collection participation parameter 510. For example, when a sending user has established a content collection participation parameter 510 of 24 hours from posting, the ephemeral timer system 202 will remove the relevant ephemeral message 502 from the ephemeral content collection 504 after the specified 24 hours. The ephemeral timer system 202 also operates to remove an ephemeral content collection 504 either when the content collection participation parameter 510 for each and every ephemeral message 502 within the ephemeral content collection 504 has expired, or when the content collection 504 itself has expired in terms of the content collection duration parameter 508.

In certain use cases, a creator of a particular ephemeral content collection 504 may specify an indefinite content collection duration parameter 508. In this case, the expiration of the content collection participation parameter 510 for the last remaining ephemeral message 502 within the ephemeral content collection 504 will determine when the ephemeral content collection 504 itself expires. In this case, a new ephemeral message 502, added to the ephemeral content collection 504, with a new content collection participation parameter 510, effectively extends the life of an ephemeral content collection 504 to equal the value of the content collection participation parameter 510.

Responsive to the ephemeral timer system 202 determining that an ephemeral content collection 504 has expired (e.g., is no longer accessible), the ephemeral timer system 202 communicates with the messaging system 100 (e.g., messaging client application 104) to cause an indicium (e.g., an icon) associated with the relevant ephemeral content collection 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
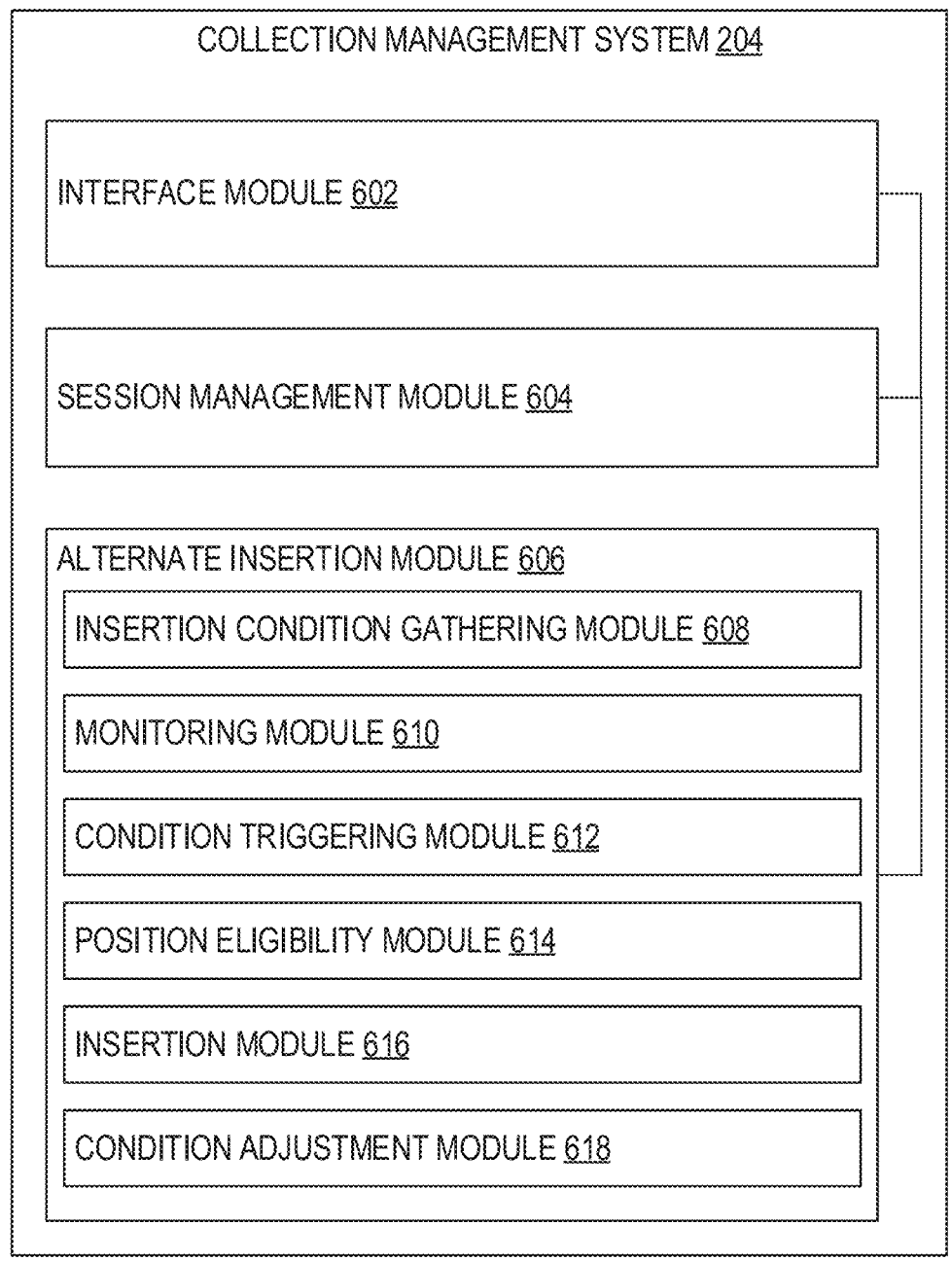
FIG. 6 is a block diagram illustrating various modules of the collection management system, according to certain example embodiments.

FIG. 6 is a block diagram illustrating various modules of the collection management system 204, according to certain example embodiments. The collection management system 204 is shown as including an interface module 602, a session management module 604, and an alternate insertion module 606. As shown, the alternate insertion module 606 includes an insertion condition gathering module 608, a monitoring module 610, a condition triggering module 612, a position eligibility module 614, an insertion module 616, and a condition adjustment module 618. The various modules of the collection management system 204 are configured to communicate with each other (e.g., via a bus, shared memory, or a switch). Any one or more of these modules may be implemented using one or more computer processors (e.g., by configuring such one or more computer processors to perform functions described for that module) and hence may include one or more of the computer processors.

Any one or more of the modules described may be implemented using hardware alone (e.g., one or more of the computer processors of a machine) or a combination of hardware and software. For example, any described module of the collection management system 204 may physically include an arrangement of one or more of the computer processors (e.g., a subset of or among the one or more computer processors of the machine) configured to perform the operations described herein for that module. As another example, any module of the collection management system 204 may include software, hardware, or both, that configure an arrangement of one or more computer processors (e.g., among the one or more computer processors of the machine) to perform the operations described herein for that module. Accordingly, different modules of the collection management system 204 may include and configure different arrangements of such computer processors or a single arrangement of such computer processors at different points in time. Moreover, any two or more modules of the collection management system 204 may be combined into a single module, and the functions described herein for a single module may be subdivided among multiple modules. Furthermore, according to various example embodiments, modules described herein as being implemented within a single machine, database, or device may be distributed across multiple machines, databases, or devices.

To avoid obscuring the inventive subject matter with unnecessary detail, various functional components (e.g., modules) that are not germane to conveying an understanding of the inventive subject matter have been omitted from FIG. 6. However, it will be appreciated that various additional functional components may be supported by collection management system 204 to facilitate additional functionality that is not specifically described herein. Furthermore, the various functional modules depicted in FIG. 6 may reside on a single computing device or may be distributed across several computing devices in various arrangements such as those used in cloud-based architectures.

The interface module 602 provides a user interface that enables a user to initiate a content discovery session. A content discovery session is a session in which content items included in a content discovery collection are presented to the user. The interface module 602 presents a listing of available content discovery collections to the user, which the user can utilize to select to initiate a content discovery session. For example, the interface module 602 presents icons identifying the available content discovery collections that are selectable to initiate a content discovery session of the selected content discovery collection. The icons presented by the interface module 602 identify the corresponding content discovery collection. For example, the icons may include the name, emblem, logo, etc., of the entity associated with the content discovery collection, such as the magazine, new outlet, etc., associated with the content discovery collection.

The session management module 604 initiates and manages a content discover session. For example, the session management module 604 initiates a content discovery session in response to a user selecting a content discovery collection listed by the interface module 602. Initiating a content discovery session includes gathering content items included in the content discovery collection and presenting the content items according to their corresponding sequential order. For example, the session management module 604 initially presents the content item from the content discovery collection that is ordered first sequentially.

The session management module 604 provides user interface element (e.g., buttons) that enable a user to change the content item that is presented as part of the content discovery session. For example, the session management module 604 presents an advancement button that enables a user to view the next or previous sequentially ordered content item in the content discovery collection. Selection of the advancement button results in an advancement input instructing the session management module 604 to access and present the next or previous sequentially ordered content item. Accordingly, a user utilizes the provided advancement button to view the various content items included in the content discovery session.

The session management module 604 also enables a user to view additional content associated with a content item. Some content items such as videos, articles, applications, etc., may not initially be completely displayed to a user. The session management module 604 may initially present a portion of these content items, such as a title of an article, summary of the article, etc., and present user interface elements that enable the user to access the additional content that is not presented. For example, the session management module 604 initially presents a user with the title and summary of an article as well as a button that the user may select to view the article in its entirety. The user utilizes the button (i.e., selects the button) to the read the article if so desired. Alternatively, the session management module 604 enables the user to scroll down to read the article.

The alternate insertion module 606 inserts alternate content items into a content discovery session. An alternate content item is a content item that is not included in the content discovery collection being presented in the content discovery session. For example, an alternate content item is a content item provided by an entity (e.g., advertiser, sponsor, etc.), that is different than the entity associated with the content discovery collection.

The alternate insertion module 606 utilizes logic to insert alternate content in a manner that provides a consistent user experience. Providing a consistent user experience includes presenting alternate content items at consistent intervals based on multiple factors such as the type of content and the user's consumption. The types of content included in each content discovery collection may vary, as may user consumption of the content items. Content items such as news articles generally take longer to consume than content items such as images. For example, a user will most likely spent a longer period of time reading a news article than viewing a single image. Consumption of content items also varies based on the individual users. For example, some users move through content quickly, whereas some users take a longer period of time to view each content item. The alternate insertion module 606 utilizes logic that takes into account these factors rather than utilizing a single rule for all users and content discovery collections. Utilizing a single rule, such as inserting an alternate content item after a predetermined number of content items are viewed, leads to an inconsistent user experience. For example, users viewing a content discovery collection that includes only images will be presented with alternate content items at a higher rate than users viewing content discovery collections that include only articles. Likewise, users that consume content quickly will be presented with alternate content items at a higher rate than users that spend more time viewing each individual content item. Presenting content items at a higher rate than desired presents a technical problem because it results in an unwanted overall increase in the amount data transmitted to client devices. This unwanted increase in data transmissions results in an undesired strain on system resources as well as increased system latency. Accordingly, eliminating transmission of excess content item improves overall system performance by reducing the strain of system resources and lowering system latency.

To alleviate these issues, the alternate insertion module 606 utilizes multiple insertion conditions to determine whether to insert an alternate content item. Insertion conditions dictate when an alternate content item should be inserted into a content discovery session. For example, insertion conditions include thresholds that, when met, result in insertion of an alternate content. Example thresholds include a threshold number of content items that are presented and a threshold amount of elapsed time. Utilizing multiple insertion conditions provides a consistent user experience.

To account for varying types of content items included in each content discovery collection, each content discovery collection is associated with its own set of insertion conditions. Accordingly, a content discovery collection that includes primarily images will have a different set of insertion conditions than a content discovery collection that includes primarily articles. The insertion conditions for a content discovery collection can be based on the type of content included in the content discovery collection. For example, a content discover collection that includes mainly images may have a higher threshold of viewed content items than a content discovery collection that includes mainly articles because users generally spend more time viewing articles. Likewise, a content discovery collection that includes mainly images may have a lower threshold of elapsed time than a content discovery collection that includes mainly articles.

The alternate insertion module 606 includes an insertion condition gathering module 608 that gathers the insertion conditions for a selected content discovery collection. For example, the insertion condition gathering module 608 gathers the insertion conditions for a content discovery collection in response to a content discovery session being initiated. The content gathering module 608 gathers the insertion conditions from the collection table 306.

The monitoring module 610 monitors activity during a content discovery session, such as content items presented, alternate content items presented, time elapsed, etc. The monitoring module 610 also calculated values, such as the number of content items presented after the content discovery session was initiated, the number of content items presented after a most recent alternate content item was presented in the content discovery session, an amount of time elapses after the content discover session was initiates, an amount of time elapses after a most recent alternate content item was presented in the content discovery session, etc.

The condition triggering module 612 determines whether an insertion condition has been triggered. The condition triggering module 612 determines whether an insertion has been triggered in response to receiving an advancement input resulting from a user selection to view the next or previous content item in the content discovery collection.

The condition triggering module 612 utilizes data and/or calculated values provided by the monitoring module 608 to determine whether an insertion condition has been met. For example, the condition triggering module 612 retrieves a number of content items presented as part of the content discovery session (e.g. number of content items presented upon initiation of the content discovery session or the number of content items presented after an alternate content item was presented as part of the content discovery session), and then compares the number of content items to a threshold number of content items dictated by the insertion condition. If the number of content items meets or exceeds the threshold number, the condition triggering module 612 determines that the insertion condition has been triggered. Alternatively, in the number of content items does not meet or exceed the threshold number, the condition triggering module 612 determines that the insertion condition has not been triggered.

The insertion conditions can include any type of threshold. For example, insertion conditions may include thresholds based on the total number of content items presented during a content discovery session, the number of content items presented after an alternate content item was presented during the content discovery session, a number of a specified type of content item (e.g., image, article, video, etc.) presented during the content discovery session, an amount of elapsed time from initiation of the content discovery session, an amount of elapsed time from presentation of an alternate digital content item in the content discovery session, etc. These are only some examples of insertion condition thresholds and they are not meant to be limiting. An insertion condition can include thresholds based on any factor, and this disclosure anticipates all such embodiments.

An insertion condition can include multiple individual conditions that should be met to trigger the insertion condition. For example, an insertion condition may dictate that two or more thresholds be met for the insertion condition to be triggered. As another example, an insertion condition can dictate that each of a set of conditions be met to trigger the insertion condition. Alternatively, an insertion condition may dictate that at least a minimum number or percentage of the individual conditions be met to trigger the insertion condition. As an example, an insertion condition including five individual conditions is triggered when at least three of the individual conditions are met.

The position eligibility module 614 determines whether an upcoming position within the content discovery collection is eligible to receive an inserted alternate content item. Certain positions within a content delivery collection may be designated as being ineligible to receive an inserted alternate content item. For example, the final position in the content discovery content collection may be designated as ineligible to receive an inserted alternate content item to prevent users from being presented with an alternate content item as the last content item. As another example, an entity that provides a content discovery collection may desire that alternate content not be inserted between certain sequential content items. Accordingly, the entity may designate these positions within the content discovery collection as being ineligible to receive an inserted alternate content item.

The position eligibility module 614 determines whether the position of the upcoming content item in the content discover collection has been designated as ineligible to receive an alternate content item. If the position eligibility module 614 determines that the position of the upcoming content item is ineligible to receive an alternate content item, an alternate content item will not be inserted into the content discovery session at that position. However, an alternate content item may be inserted into an upcoming position if an insertion condition has been met, for example, in response to the collection management system 204 receiving another advancement input.

The insertion module 616 inserts alternate content items into a content discovery session. Inserting an alternate content item includes presenting the alternate content item prior to the upcoming content item from the content discovery collection. For example, if a user has selected to advance from a presented content item in the content discovery collection to the next content item in the sequential order, the insertion module 616 presents the alternate content item prior to presenting the next content item in the sequential order. The alternate content item does not replace the next content item, but is rather presented prior to the next content item. Accordingly, the user will be presented with the next content item after the alternate content item has been presented to the user.

The condition adjustment module 618 adjusts insertion conditions based on the user's monitored consumption of content items. For example, in response to determining that a user consumes content quickly, the condition adjustment module 618 increases the threshold number of presented content items. Alternatively, in response to determining that a user is consuming content slowly, the condition adjustment module 618 decreases the threshold number of presented content items. Adjusting the insertion conditions based on the user's monitored content consumption fine tunes the insertion conditions to provide a consistent user experience amongst multiple users and multiple content discover collections.

Figure 7:
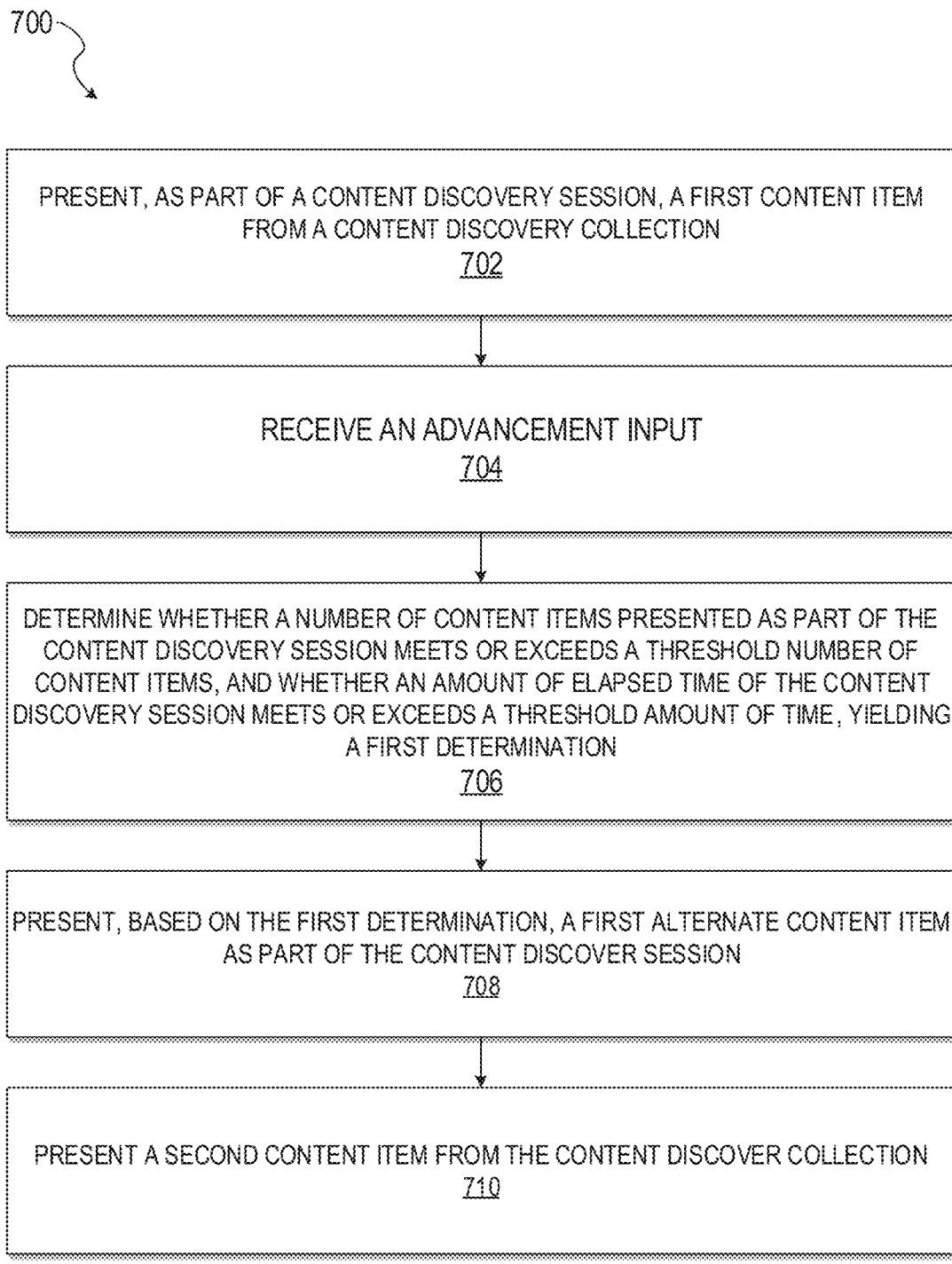
FIG. 7 is a flowchart illustrating a method for inserting an alternate content item into a content discovery session, according to certain example embodiments.

FIG. 7 is a flowchart illustrating a method 700 for inserting an alternate content item into a content discovery session, according to certain example embodiments. The method 700 may be embodied in computer-readable instructions for execution by one or more computer processors such that the operations of the method 700 may be performed in part or in whole by the collection management system 204; accordingly, the method 700 is described below by way of example with reference thereto. However, it shall be appreciated that at least some of the operations of the method 700 may be deployed on various other hardware configurations and the method 700 is not intended to be limited to the collection management system 204.

At operation 702, the session management module 604 presents, as part of a content discovery session, a first content item from a content discovery collection. The content discovery collection includes a plurality of content items that are ordered sequentially for presentation in the content discovery session.

At operation 704, the session management module 605 receives an advancement input. The advancement input is received as a result of a user selecting an advancement button presented by interface module 602.

At operation 706, the condition triggering module 612 determines whether a number of content items presented as part of the content discovery session meets or exceeds a threshold number of content items, and whether an amount of elapsed time of the content discovery session meets or exceeds a threshold amount of time, yielding a first determination. The number of content items presented as part of the content discovery session indicates a number of content items presented since the content discovery session was initiated or a number of content items presented since a previous alternate content item was presents as part of the content discovery session, the previous alternate content item not being included in the content discovery session. Likewise, the amount of elapsed time of the content discovery session indicates an amount of time since the content discovery session was initiated or an amount of elapsed time since a previous alternate content item was presents as part of the content discovery session, the previous alternate content item not being included in the content discovery session.

In some embodiments, the threshold number of content items is based on a content item type of the content items included in the content discovery collection. For example, the threshold may be higher when the content items are quickly consumable, such as images, and the threshold may be lower when the content items take longer to consume, such as news articles. Likewise, in some embodiments the threshold amount of time is based on a content item type of the content items included in the content discovery collection.

At operation 708, the insertion module 616 presents, based on the first determination, a first alternate content item as part of the content discover session. The first alternate content item is not being included in the content discovery collection. In some embodiments, the first determination indicates that at least one of the two insertion conditions have been met. As another example, the first determination indicates that both of the insertion conditions have been met.

At operation 710, the session management module 604 presents a second content item from the content discover collection. The second content item is ordered after the first content item for presentation in the content discovery session. Accordingly, the user is presented with the second content item after being presented with the alternate content item.

Figure 8:
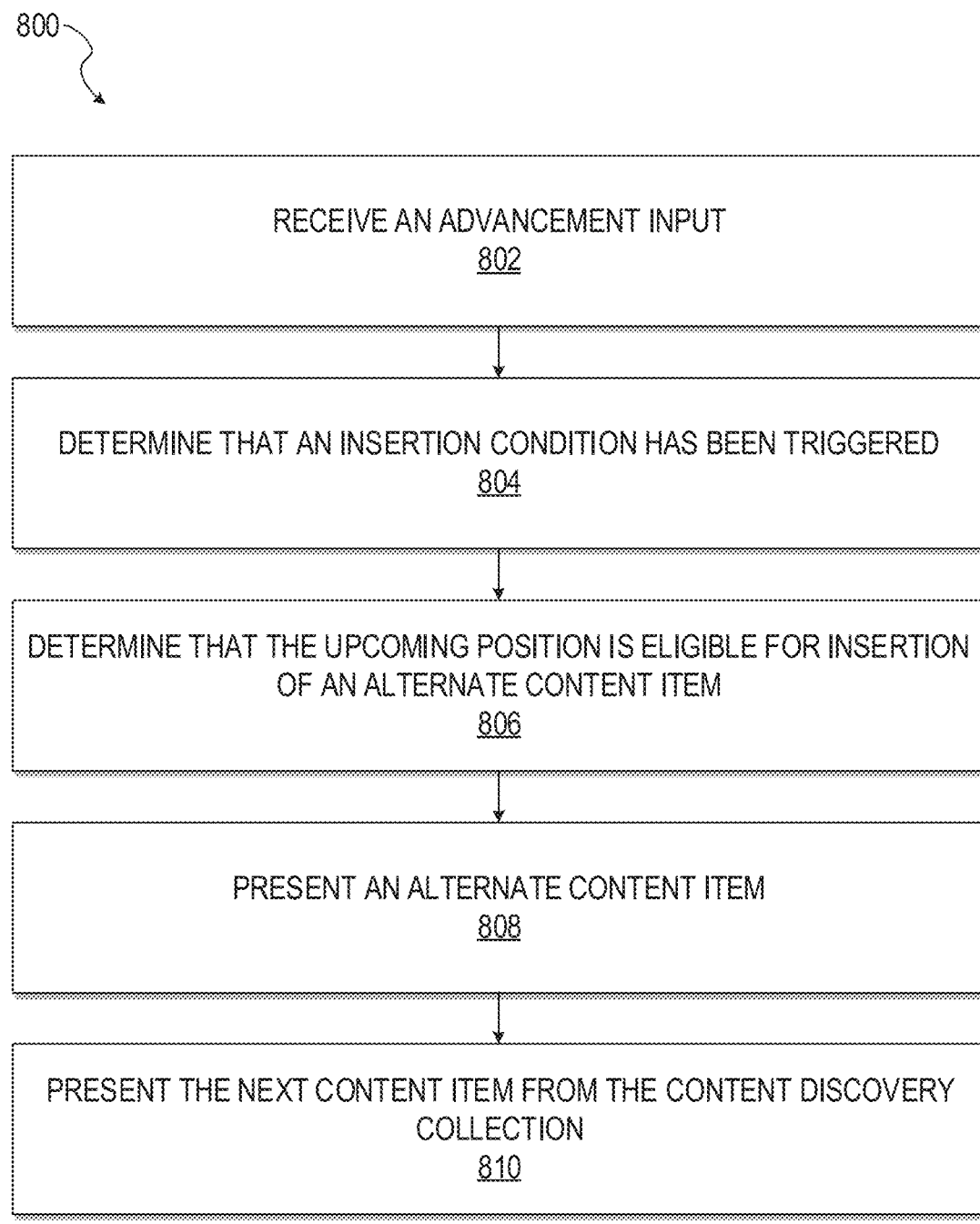
FIG. 8 is a flowchart illustrating a method for inserting an alternate content item into a content discovery session, according to certain example embodiments.

FIG. 8 is a flowchart illustrating a method 800 for inserting an alternate content item into a content discovery session, according to certain example embodiments. The method 800 may be embodied in computer-readable instructions for execution by one or more computer processors such that the operations of the method 800 may be performed in part or in whole by the collection management system 204; accordingly, the method 800 is described below by way of example with reference thereto. However, it shall be appreciated that at least some of the operations of the method 800 may be deployed on various other hardware configurations and the method 800 is not intended to be limited to the collection management system 204.

At operation 802, the session management module 605 receives an advancement input. The advancement input is received as a result of a user selecting an advancement button presented by interface module 602.

At operation 804, the condition triggering module determines that an insertion condition has been triggered.

At operation 806, the position eligibility module 612 determines that the upcoming position is eligible for insertion of an alternate content item.

At operation 808, the insertion module 616 presents an alternate content item.

At operation 810, the session management module 604 presents the next content item from the content discovery collection. Accordingly, the user is presented with the next content item after being presented with the alternate content item.

Figure 9:
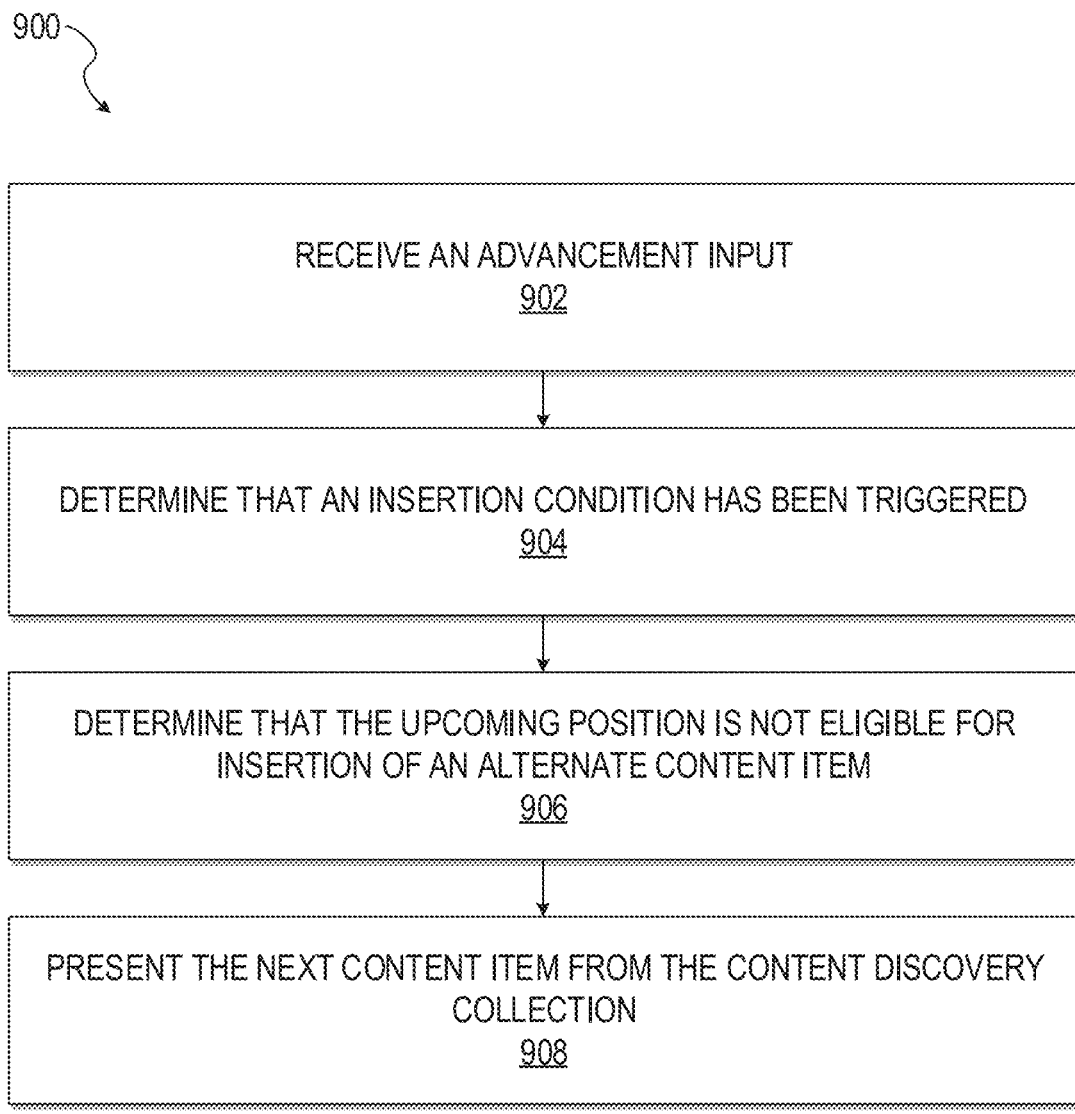
FIG. 9 is a flowchart illustrating a method inserting an alternate content item into a content discovery session, according to certain example embodiments.

FIG. 9 is a flowchart illustrating a method 900 for inserting an alternate content item into a content discovery session, according to certain example embodiments. The method 900 may be embodied in computer-readable instructions for execution by one or more computer processors such that the operations of the method 900 may be performed in part or in whole by the collection management system 204; accordingly, the method 900 is described below by way of example with reference thereto. However, it shall be appreciated that at least some of the operations of the method 900 may be deployed on various other hardware configurations and the method 900 is not intended to be limited to the collection management system 204.

At operation 902, the session management module 605 receives an advancement input. The advancement input is received as a result of a user selecting an advancement button presented by interface module 602.

At operation 904, the condition triggering module determines that an insertion condition has been triggered.

At operation 906, the position eligibility module 612 determines that the upcoming position is not eligible for insertion of an alternate content item.

At operation 908, the session management module 604 presents the next content item from the content discovery collection. Accordingly, the user is presented with the next content item after without being presented with an alternate content item.

Figure 10:
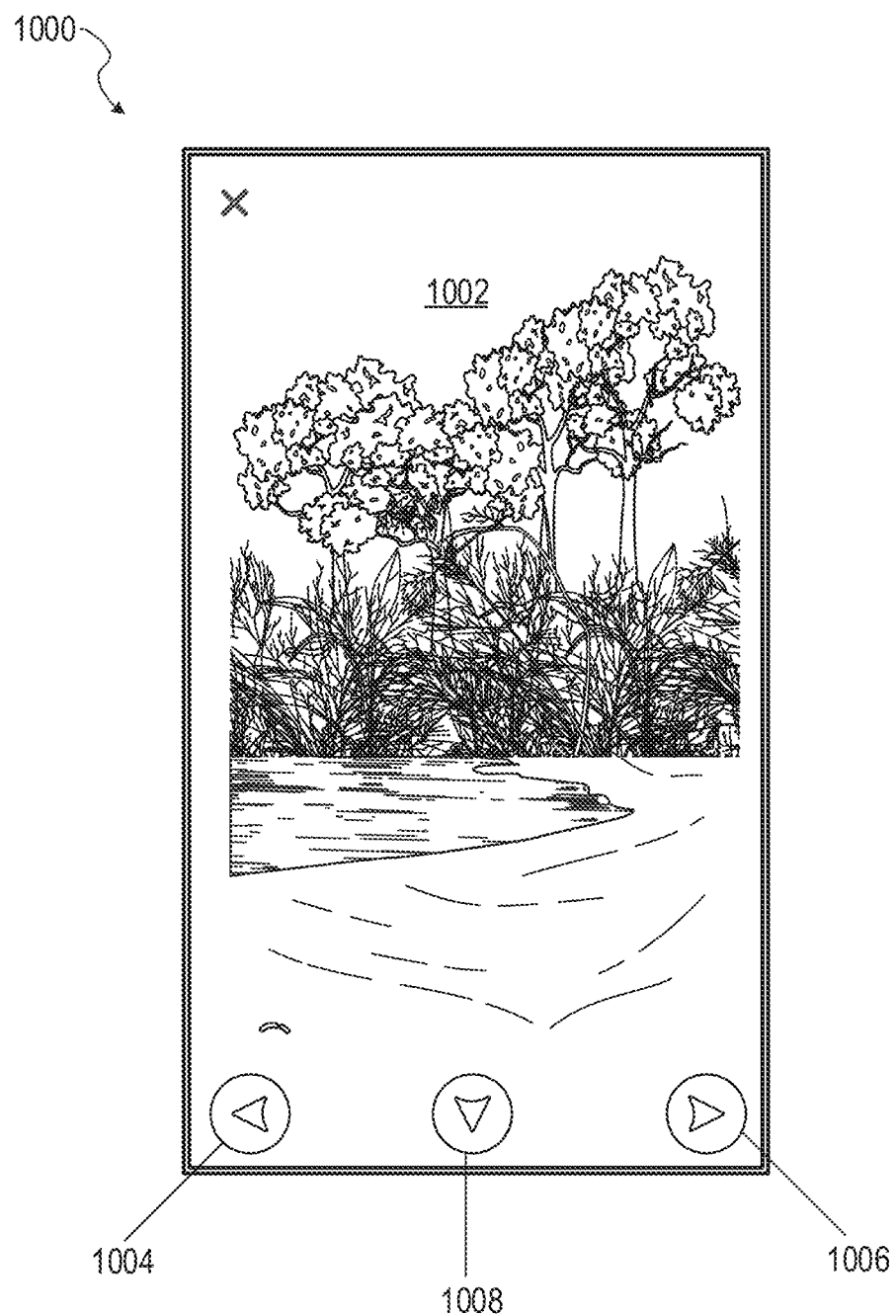
FIG. 10 is a screenshot of a content item presented as part of a content discover session.

FIG. 10 is a screenshot 1000 of a content item 1002 presented as part of a content discover session. As shown, the user is presented with a content item 1002 that is an image. The content item 1002 is included in a content discovery collection being presented as part of the content discovery session. A first user interface element 1004 enables a user to cause presentation of a different content item that is sequentially ordered prior to the presented content item 1002 in the content discovery collection. A second user interface element 1006 enables a user to cause presentation of a different content item that is sequentially ordered after the presented content item 1002 in the content discovery collection. A third user interface element 1008 enables a user to cause presentation of additional information associated with the content item 1002. For example, the additional content includes information describing the presented image, such as a location, caption, etc.

Figure 11:
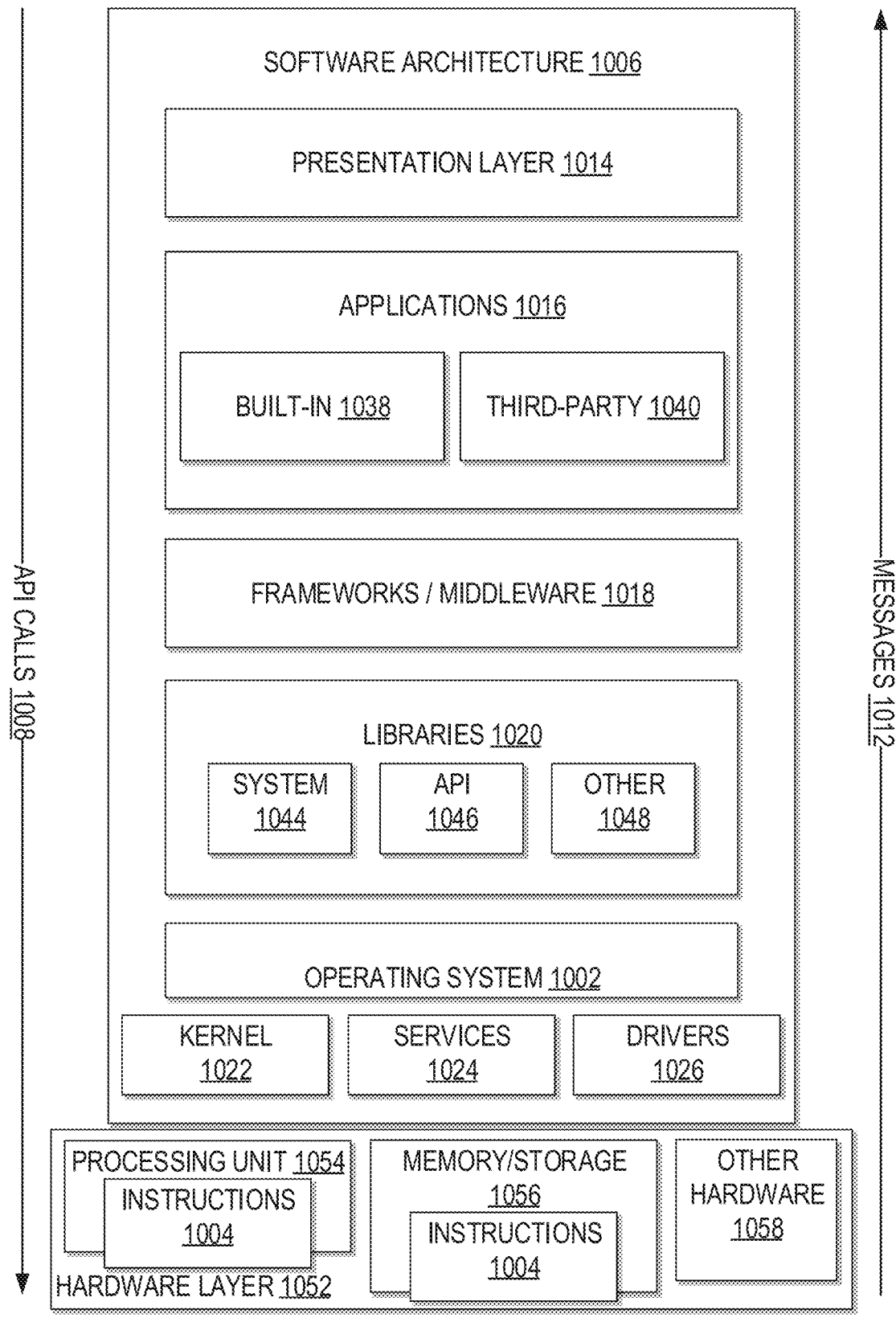
FIG. 11 is a block diagram illustrating a representative software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke Application Programming Interface (API) calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
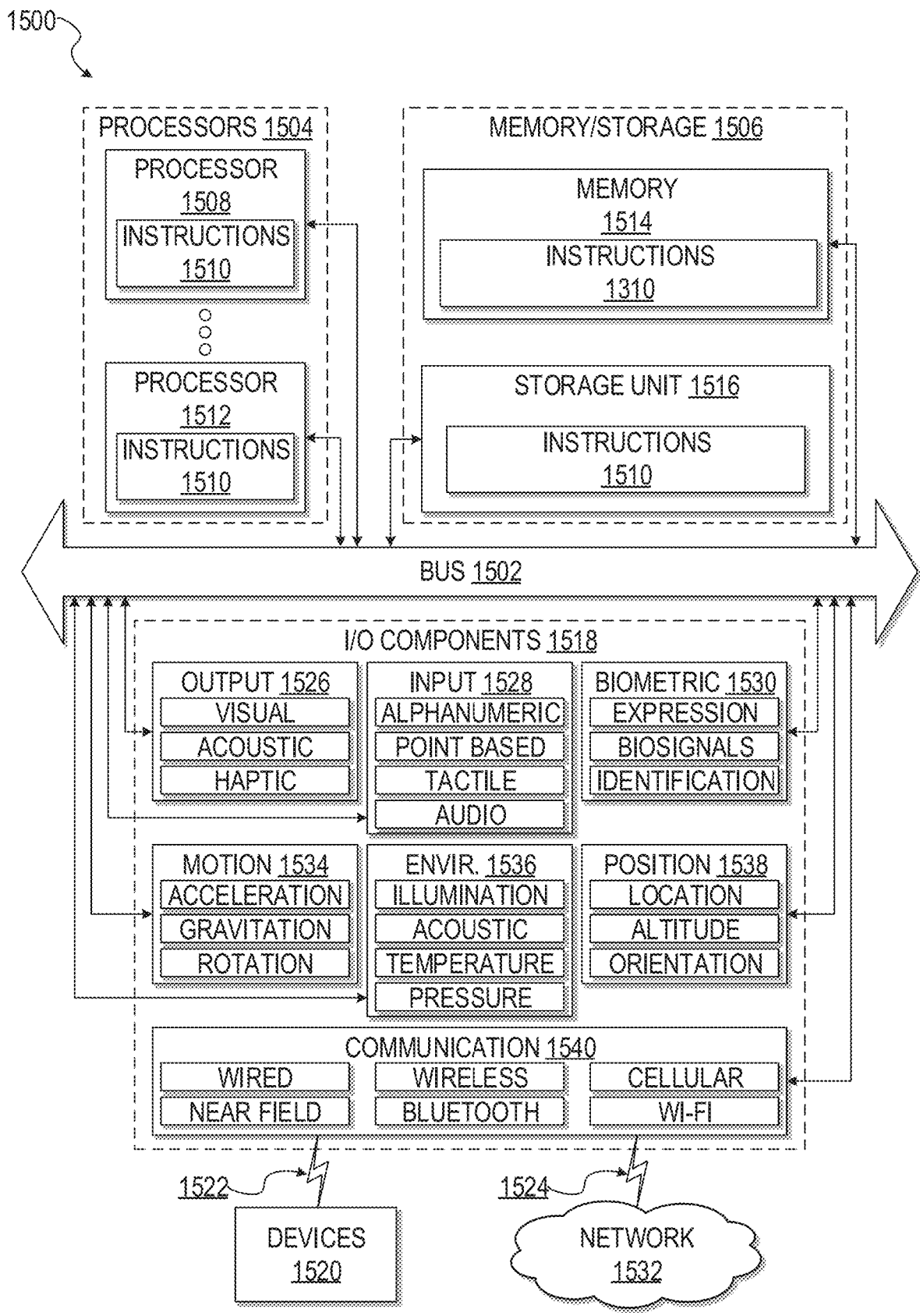
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:
1. A method comprising:
   generating for display a first portion of content items;

setting a threshold number of content items based on a first type of content associated with the first portion of content items that takes a different amount of time to consume than a second type of content;

determining a rate at which the first type of content is consumed;

adjusting a quantity of content items of the threshold number that need to be consumed before triggering display of alternate content, the quantity of content items being adjusted based on the rate at which the first type of content is consumed; and in response to determining that a number of content items in the first portion of the content items corresponds to the adjusted threshold number of content items, causing display of alternate content before presenting a second portion of the content items.

2. The method of claim 1, wherein the content items comprise a sequence of content items, and further comprising:

presenting, as part of a content discovery session, a content discovery collection including the sequence of content items, the sequence of content items being ordered sequentially for presentation in the content discovery session, a sequential ordering of the sequence of content items defining that a second content item immediately follows a first content item at a particular position in the sequence.

3. The method of claim 1, wherein the alternate content is presented if a plurality of criteria is satisfied, and wherein the second portion is presented instead of the alternate content if the plurality of criteria is not satisfied.

4. The method of claim 3, wherein the plurality of criteria includes:

if an amount of elapsed time of a content discovery session meets or exceeds a threshold amount of time;

if a particular position in the first portion is designated as eligible to receive inserted content; and if the number of content items in the first portion corresponds to the threshold number of content items, and wherein the threshold amount of time is based on a content item type of content items included in the content discovery session.

5. The method of claim 1, further comprising:

determining that the content items correspond to a type of content that takes a given amount of time to consume, wherein the threshold number is set based on the given amount of time to consume; and determining that a number of content items in the first portion of content items corresponds to the threshold number of content items.

6. The method of claim 1, wherein some positions in the first portion are predesignated as eligible to receive inserted alternate content and some positions in the first portion are predesignated as ineligible to receive inserted alternate content.

7. The method of claim 1, wherein the first type of content takes a first amount of time to consume that is shorter than a second amount of time it takes to consume the second type of content, and wherein the set threshold number of content items is smaller than another threshold of the number of content items that is associated with the second type of content.

8. The method of claim 1, wherein a first of a plurality of thresholds of the number of content items is set as the threshold when the content item type that is identified comprises an image, wherein a second of the plurality of thresholds of the number of content items is set as the threshold when the content item type that is identified comprises a news article.

9. The method of claim 8, wherein the second of the plurality of thresholds of the number of content items is smaller than the first of the plurality of thresholds of the number of content items.

10. The method of claim 1, further comprising receiving an advancement input to a particular position in the first portion, wherein the alternate content item is presented in response to receiving the advancement input.

11. The method of claim 1, further comprising increasing the threshold number in response to determining that the rate at which the first type of content is consumed is greater than a rate at which the second type of content is consumed.

12. The method of claim 11, further comprising monitoring user consumption of the content items.

13. The method of claim 1, wherein the alternate content is presented if a plurality of criteria is satisfied, wherein the second portion is presented instead of the alternate content if the plurality of criteria is not satisfied, and wherein the plurality of criteria includes: if an amount of elapsed time of a content discovery session meets or exceeds a threshold amount of time.

14. The method of claim 13, the plurality of criteria including if a particular position in the first portion is designated as eligible to receive inserted content.

15. A system comprising:

one or more computer hardware processors; and one or more computer-readable mediums storing instructions that, when executed by the one or more computer hardware processors, cause the system to perform operations comprising:

generating for display a first portion of content items;

setting a threshold number of content items based on a first type of content associated with the first portion of content items that takes a different amount of time to consume than a second type of content;

determining a rate at which the first type of content is consumed;

adjusting a quantity of content items of the threshold number that need to be consumed before triggering display of alternate content, the quantity of content items being adjusted based on the rate at which the first type of content is consumed; and in response to determining that a number of content items in the first portion of the content items corresponds to the adjusted threshold number of content items, causing display of alternate content before presenting a second portion of the content items.

16. The system of claim 15, wherein some positions in the first portion are predesignated as eligible to receive inserted alternate content and some positions in the first portion are predesignated as ineligible to receive inserted alternate content.

17. The system of claim 15, wherein the first type of content takes a first amount of time to consume that is shorter than a second amount of time it takes to consume the second type of content, and wherein the set threshold number of content items is smaller than another threshold of the number of content items that is associated with the second type of content.

18. The system of claim 15, wherein a first of a plurality of thresholds of the number of content items is set as the threshold when the content item type that is identified comprises an image, wherein a second of the plurality of thresholds of the number of content items is set as the threshold when the content item type that is identified comprises a news article.

19. A non-transitory computer-readable medium storing instructions that, when executed by one or more computer processors, cause the one or more processors to perform operations comprising:

generating for display a first portion of content items;

setting a threshold number of content items based on a first type of content associated with the first portion of content items that takes a different amount of time to consume than a second type of content;

determining a rate at which the first type of content is consumed;

adjusting a quantity of content items of the threshold number that need to be consumed before triggering display of alternate content, the quantity of content items being adjusted based on the rate at which the first type of content is consumed; and in response to determining that a number of content items in the first portion of the content items corresponds to the adjusted threshold number of content items, causing display of alternate content before presenting a second portion of the content items.

20. The non-transitory computer-readable medium of claim 19, wherein the alternate content is presented if a plurality of criteria is satisfied, and wherein the second portion is presented instead of the alternate content if the plurality of criteria is not satisfied, wherein the plurality of criteria includes:

if an amount of elapsed time of a content discovery session meets or exceeds a threshold amount of time; and if a particular position in the first portion is designated as eligible to receive inserted content, and wherein the threshold amount of time is based on a content item type of content items included in the content discovery session.

* * * * *